(No Model.)
J. FRANKLIN.
SPECTACLES.
No. 305,685. Patented Sept. 23, 1884.
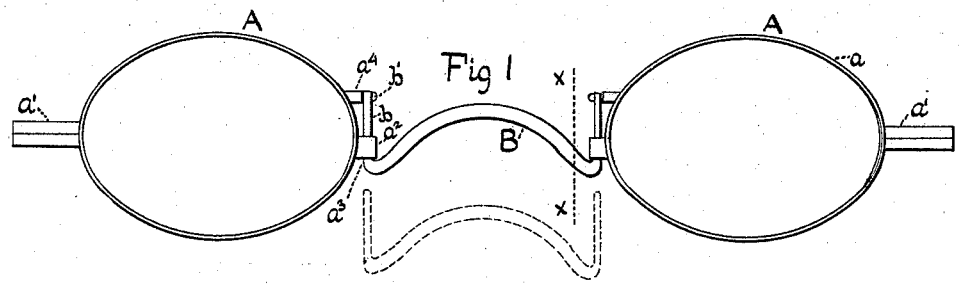
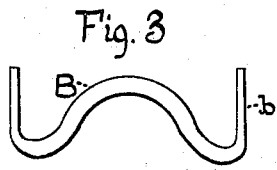 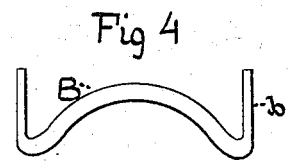
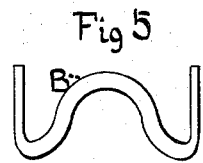 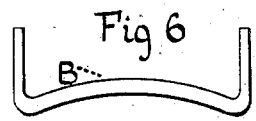
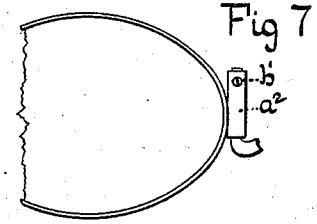 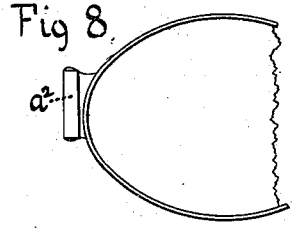
Witnesses
Fred W. Perkins
J. H. Preston
Inventor
Joseph Franklin

UNITED STATES PATENT OFFICE.

JOSEPH FRANKLIN, OF KANSAS CITY, MISSOURI.

SPECTACLES.

SPECIFICATION forming part of Letters Patent No. 305,685, dated September 23, 1884.

Application filed April 1, 1884. (No model.)

*To all whom it may concern:*

Be it known that I, JOSEPH FRANKLIN, a citizen of the United States, residing at Kansas City, in the county of Jackson and State of Missouri, have invented a new and useful Improvement in Nose-Pieces for Spectacles; and I do hereby declare that the following is a full, clear, and exact description of the invention, which will enable others skilled in the art to which it appertains to make and use the same, reference being had to the accompanying drawings, forming part of this specification.

My invention has for its object a new and useful improvement in nose-pieces for spectacles, whereby the nose-piece is readily accommodated to the particular shape of the nose and face of the wearer at once and removably attached to the spectacles in a new and novel way.

In the fitting of spectacles to the wearer's nose I have discovered in practice that, owing to the dissimilarity in the height and also width of the bridge of the nose, and in the uniform construction of the nose-piece to spectacles, that the spectacles cannot be suitably adapted to the peculiar formations of the ossa nasi and oftentimes deformity of the organ itself, and the result is that the vision is obstructed, and the spectacles do not retain themselves in place. Either the bridge of the nose is too high, carrying the lenses above the pupil of the eye, or too low, or otherwise too narrow, and, as is frequently the case, the dissimilarity in the width of faces combined makes the fitting of the spectacles of the utmost difficulty. To obviate this, I construct my nose-pieces to spectacles, to meet the customary demand for suitable-fitting spectacles, either straight or in the many varied widths and forms as shall be found expedient and attach them in the manner herein described.

In the drawings, Figure 1 is a front view of a pair of spectacles, showing my improved removable nose-piece. Fig. 2 is a cross view taken on the line $x\ x$ of Fig. 1. Figs. 3, 4, 5, and 6 are alternate views of the nose-piece in form and width. Figs. 7 and 8 show alternate means for securing the nose-piece to the spectacles.

A A represent a pair of spectacles; $a\ c$, the lens-frame; $a'$, the temple-joints; $a^2$, a perforated longitudinal projection of the frame $a$; $a^3$, the perforation in the projection $a^2$; $a^4$, a longitudinal projection of the frame $a$ above the perforated projection $a^2$.

B represents the nose-piece; $b$, the extension of the nose-piece; $b'$, the screw for securing the nose-piece removably to the lens-frame.

In the construction of my improved nose-piece B, I make the said piece from any material preferred which will retain a rigid shape suitable to the nose and width of face. The nose-piece B is also made with the extended portions $b\ b$ of a suitable length for their attachment to the spectacles-frame. I then, in making the lens-frame $a$, form upon that portion of the frame which in use is contiguous to and rests upon the nose of the wearer a longitudinal projection, $a^2$, thereof, which is arranged relatively below the focal point of the lenses in said frame, whereby nose-pieces of various widths and heights can be inserted therein without affecting or changing the sight.

Slightly above the projection $a^2$ of the frame $a$, I form also upon said frame a projection, $a^4$, thereof, which is less in extent than the projection $a^2$ of the frame $a$, to permit the end $b$ of the nose-piece to pass close by the said projection $a^4$ in passing through the perforation in the projection $a^2$ of the said frame, and to enable its attachment. I then form a vertical perforation, $a^3$, in the projection $a^2$ of the frame of a suitable size to receive the extension $b$ of the nose-piece. The projection $a^4$ of the spectacles-frame is then made with a suitable screw-threaded opening in its longitudinal direction, and the end $b$ of the nose-piece with a suitable perforation. The extensions $b\ b$ of the nose-piece are then bent up in a vertical relation, as seen in the drawings, so as to enter the perforation $a^3$ in the extension $a^2$ of the frame, and then inserted therein. The perforations in the end of the extension $b$ are thereby brought opposite the screw-threaded openings in the projections $a^4$ of the frame, and the screw $b'$ inserted, securing the parts removably to the lens-frame.

To vary the height of the nose-piece in the same vertical relation with the spectacles, the extensions $b$ of the said nose-piece, which are inserted in the projections $a^2$ of the spectacles, are released and drawn out to the required distance and then secured as before.

The extensions $b$ of the nose-piece may be made in any suitable lengths to give the height of lenses their proper position in relation to the nose.

In constructing the frame of the spectacles the projection $a^2$ may be made a part thereof, or as shown in a serviceable form in Fig. 7, in which the extension $b$ of the nose-piece may be fitted to the projection so as to accommodate the wearer of the spectacles, and subsequently secured at any desired point by the screw $d'$, or other device.

In practice the projection $a^2$ of the spectacles should be as slight as possible, to permit the attachment and not throw the lenses too far away from each other.

The construction, as seen in Fig. 1, may be varied, as shown in Figs. 7 and 8, where a single perforated projection is made, and other devices for securing the ends of the nose-piece may be substituted for the screw. The extension $b$ of the nose-piece B is slightly flattened, as seen in Fig. 2, but the shape of the said piece may be changed, if preferred.

Fitted to any spectacles my improvement is a valuable addition, for the change in the nose-piece can be instantly made for any preferred metal commonly in use and with less labor and expense than by former methods.

It will be seen that the lenses may be formed with a projection and the nose-piece attached to it should the frame be dispensed with. It will also be seen that any well-known nose-piece can be made more advantageous to the wearer by an adjustable attachment.

Having fully described my invention, what I now claim as new, and desire to secure by Letters Patent, is—

The combination, with the nose-piece and vertical extensions of said nose-piece, of a lens-frame and suitable perforated projections of said lens-frame, one of which is adapted to receive the said extension of the nose-piece and the other to receive the securing device, as described.

In testimony whereof I have hereunto set my hand in the presence of two witnesses.

JOSEPH FRANKLIN.

Witnesses:
   FRED. W. PERKINS,
   J. H. PRESTON.